UNITED STATES PATENT OFFICE.

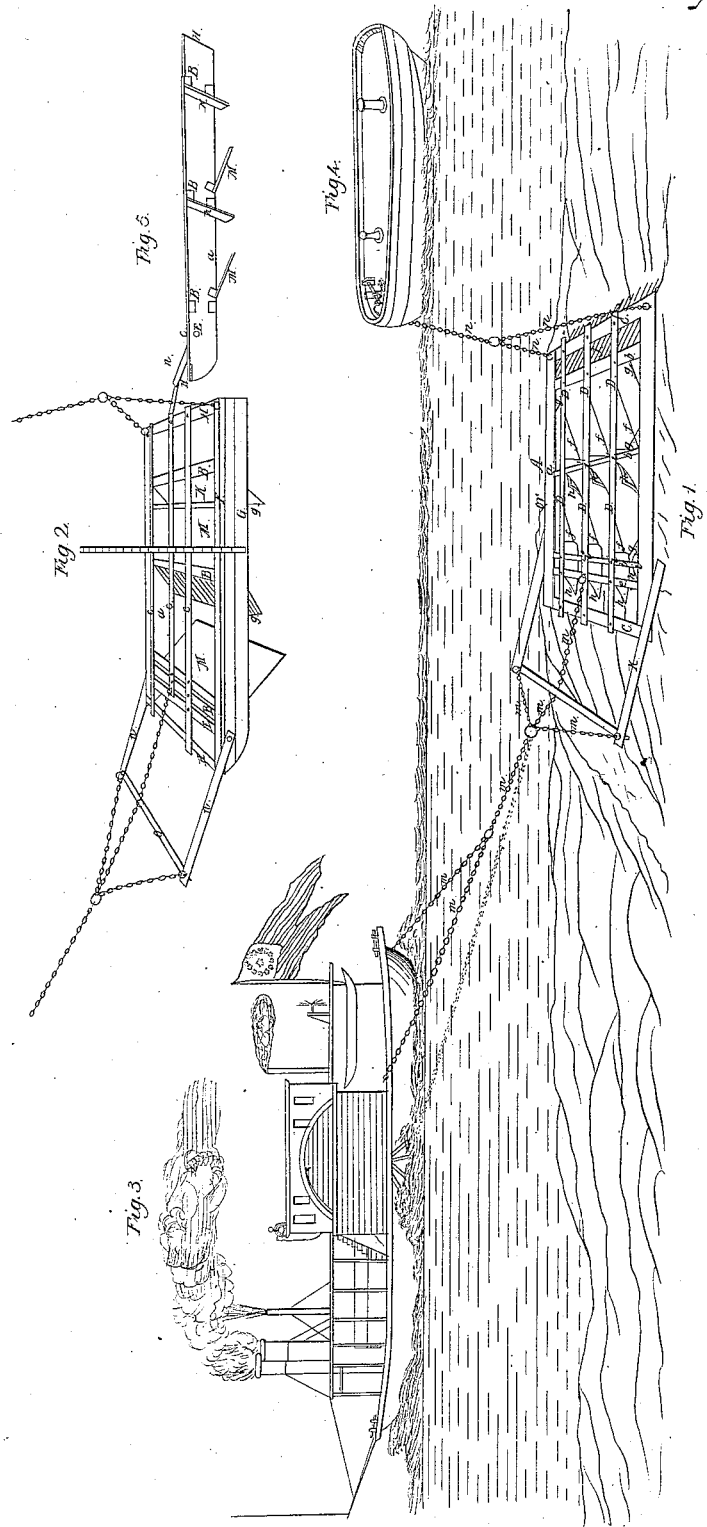

J. R. PUTNAM, OF NEW ORLEANS, LOUISIANA.

MACHINERY FOR REMOVING BARS OR OTHER OBSTRUCTIONS FROM HARBORS AND RIVERS AND FOR FORMING AND CLEANING OUT DOCKS.

Specification of Letters Patent No. 2,083, dated May 6, 1841.

*To all whom it may concern:*

Be it known that I, JAMES R. PUTNAM, of the city of New Orleans and State of Louisiana, have invented a new machine for removing obstructions or bars from the mouths of harbors and in rivers and for forming and clearing out docks, ships, &c.; and I do hereby declare that the following is a full and exact description of the machine.

The nature and design of my invention consists in a new and economical plowing and dredging machine for the purpose of loosening and taking away mud &c. forming bars or other obstructions in or at the mouths of rivers or harbors, as also for the other purposes as above stated.

To enable others skilled in the art, to make and use my invention I will proceed to describe its construction and operation reference being had to the accompanying drawings making a part of this specification.

Figure 1 represents a plowing machine for the purpose of breaking up the surface of the bar, when of a consistency too compact to be removed by the dredging machine Fig. 2. Fig. 2 represents a dredging machine intended to carry off and remove the dirt &c. broken up and loosened by the plowing machine as represented at Fig. 1. Fig. 3 represents a steamboat for the purpose of working the said machine. Fig. 4 represents a barge intended to trip or hang the after part of said machine and preserve its level when it passes into deep water. Fig. 5 a vertical longitudinal section of the dredging machine, Fig. 1. The plowing machine is constructed as follows.

$a$ $a$ and $c$ $c$ represents the respective sides and ends of a frame work of iron, the sides $a$ $a$ being each 30 feet long, 4 inches wide and 3 inches thick and the ends C C being each 24 feet in length 2½ inches wide and ½ inch thick, the said sides and ends are to be firmly put together by screw bolts and clasps at their ends.

$b$, $b$, $b$ are three cross bars of iron 24 feet long 4 inches wide and 4 inches thick secured to and connecting the $a$ $a$ of the frame work.

D, D, D are 3 longitudinal bars of iron 30 feet long 2½ inches wide and ½ inch thick secured to and connecting the ends C C of the frame.

$e$ is an axle of round iron passing beneath and across the frame $a$ $a$ and firmly secured to it, 26 feet long and 2 inches thick.

$k$ $k$ are two bars of iron 15 feet long and 2 inches thick forming two arms and working upon the axle $e$; L, an iron crossbar 26 feet long and 2 inches thick and connecting two arms K K and with them forming a frame working upon the axle $e$ for the purpose of directing the movement of the machine.

$h$, $h$, $h$, $h$, $h$, $h$, $h$; are seven double plows four of which are strongly secured and bolted upon the under surface of the frame on the foremost cross bar $b$ and the three others are in like manner secured and placed on the second cross bar $b$ and in such a manner as to follow in the vacancies left between the four plows on the foremost bar $b$.

$i$ $i$ $i$ $i$ $i$ $i$ represent the bolts by which the plows are secured to the frame.

$f$, $f$, $f$, $f$, $f$, $f$, $f$, are seven braces of round iron 10 feet long and 1½ inches thick secured to the plows and frame for the purpose of steadying and keeping the plows in their position.

J represents 14 cutters attached by clasps to the upper surface of the hindermost bar $b$ curving slightly downward so as to bring their ends to a level with the bottom of the plows and extending backward somewhat beyond the hind part of the frame C.

$n$ $n$ represents the chains for supporting and tripping the rear of the machine, the two lower pieces $n$ $n$ are attached to and work in two ring bolts one at each corner of the rear of the frame and their upper ends are brought together into one large ring from which the remaining part $n$ is single and is worked through the bow of the barge represented at Fig. 4.

$m$, $m$, $m$, $m$, $m$, $m$, $m$; represent the chains for working and dragging the machine, a strong ring bolt is placed on the center longitudinal bar $a$ where it is intersected by the axle $e$ and passes through both; to this ring is attached one end of the center chain $m$ which passes through another ring bolt fixed in the center of the cross bar L and finally terminates and is attached to a ring outside the bar L; from this last ring proceed two chains m m the ends of which are respectively attached to the two corners of the frame k k L by means of two ring bolts, in which they work; from the ring forming the apex of the lower triangle proceeds another and a single chain m which at its other end is connected with a ring from which again proceeds two other chains or arms m m which passes respectively on either side of the steamboat on board of which they are worked.

g, g, g, g, g, g, g, g; are 8 iron braces 6 feet long and 3 inches wide passing from the bars b b b are secured to the sides a a for the purpose of strengthening the said bars.

Fig. 2. The dredging machine is constructed as follows: a, a; represents the two sides formed of strong boiler iron 30 feet in length 2½ ft. in depth and ½ inch thick which are placed at such a distance apart as will admit of their being connected by the bars H H which pass across each end of and are strongly secured to the side, a a they are to be formed of iron 24 feet long 3 inches wide and 1 inch thick. F F represent two iron plates 30 feet long 5 inches wide and 1 inch thick, which are to pass along and to be firmly attached to the upper and outside of the two sides a a. G G represent two iron plates 30 feet long 3 inches wide and 1 inch thick which are to pass along and be firmly attached to the lower and outside parts of the two sides a, a. B, B, B are three cross bars of iron 24 feet long 4 inches wide and 3 inches thick connecting the two sides a a to which they are firmly attached and bolted at their respective ends, there are likewise 3 bars of the same dimensions and placed in a similar manner across the bottom of the machine. C, C, C, are three iron bars 30 feet long 3 inches wide and 1 inch thick, connecting the two ends H H to which they are firmly bolted, and are further bolted to the cross bars B, B, B at their intersections.

K K Fig. 2, are two scrapers passing across the machine formed of plate iron 24 feet wide 5 feet deep and ½ inch thick they are attached at their upper edge to the cross bars B B project forward and downward at a slight angle are strongly connected at their ends with the sides a a and project below the under surface of the machine as at g, g.

M, M Fig. 2, represent two plates extending across the machine formed of plate iron 24 by 8 feet wide and ½ inch thick, these two plates are attached to and work upon a swivel bar passing across the bottom of the machine and forms with the sides a a and scrapers K K, a compact box as represented at M in the rear part of the figure, leaving a small space between the scraper K and edge of plate M through which the earth &c., is forced up, on the inclined surface of the scraper K and lodged upon the bottom plate M M in the front of the figure represents one of the plates open or falling down to let out the dirt as when the machine is tripped or dragged into deep water.

E represents an iron axle 26 feet long by 2 inches thick passing across the machine from a to a and projecting beyond at each end firmly secured and bolted to said sides and at its intersection with the longitudinal bars C C C.

N N, Fig. 2, represent two bars or arms of round iron 15 feet long and 2 inches thick working upon the projecting ends of the axle E and connected at the others by the cross bar O.

O represents a cross bar of round iron 26 feet long 2 inches thick connecting the two arms N, N and with them forming a frame working upon the axle E for the purpose of directing the movement of the machine.

P Fig. 2 represents a gaging rod to ascertain the depth of water made at each cut. The chains for tripping, dragging and working this machine, are placed arranged, connected, and worked in precisely the same manner as in the plowing machine represented in Fig. 1 and described in the specifications thereof represented in the drawing at Figs. 3 and 4. This apparatus Fig. 1 is dragged over the bar its whole length and when it passes into deep water, the chains are to be hove in on the stem of the steamboat Fig. 3 and bow of the barge Fig. 4 by steam capstan or windlass power and the machine suspended between the boat and barge above the surface of the bar, thus allowing them to return and repeat the operation until the whole is broken up and prepared for the action of the dredging machine Fig. 2. The depth of cut to be regulated solely by the angle of the chains and may be diminished to a few inches (if necessary) according to the length of chain paid out from the steamboat and barge.

In putting the dredging machine Fig. 2 into operation the bar must be divided into sections and commence at the outer section as it will be necessary to drag the machine but a short distance to fill the boxes, besides the advantage with regard to power in dragging the load down hill.

This machine is worked in the same manner as the former and when it passes into deep water, being suspended by the chains, the bottom plates fall and the load discharges itself, whereby the same process, the operation is repeated, until all that is broken up be removed. Thus the two machines are to be used alternately until a channel of sufficient depth is made (the size and weight of the machines to be varied according to the magnitude of the work).

What I claim as my invention and which I desire to secure by Letters Patent is—

1. The combination of the scrapers K, K, with the swivel plates M, M for the purpose and in the manner described.

2. Also the arrangement of plows, in combination with the cutters J for the purpose and in the manner specified.

J. R. PUTNAM.

Witnesses:
 GEO. BALLS,
 WILLIAM CUF.